(12) United States Patent
Gieras et al.

(10) Patent No.: US 10,958,113 B2
(45) Date of Patent: Mar. 23, 2021

(54) SELF-EXCITING SYNCHRONOUS RELUCTANCE GENERATORS

(71) Applicant: Hamilton Sundstrand Corporation, Charlotte, NC (US)

(72) Inventors: Jacek F. Gieras, Glastonbury, CT (US); Gregory I. Rozman, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/692,935

(22) Filed: Nov. 22, 2019

(65) Prior Publication Data

US 2020/0091783 A1    Mar. 19, 2020

Related U.S. Application Data

(63) Continuation of application No. 15/634,795, filed on Jun. 27, 2017, now Pat. No. 10,491,055.

(51) Int. Cl.
*H02K 1/14* (2006.01)
*H02K 21/44* (2006.01)
*H02K 21/04* (2006.01)
*H02K 1/17* (2006.01)
*H02K 1/22* (2006.01)
(Continued)

(52) U.S. Cl.
CPC ............. *H02K 1/145* (2013.01); *H02K 1/146* (2013.01); *H02K 1/17* (2013.01); *H02K 1/22* (2013.01); *H02K 11/0094* (2013.01); *H02K 11/046* (2013.01); *H02K 21/04* (2013.01); *H02K 21/44* (2013.01); *H02K 21/48* (2013.01)

(58) Field of Classification Search
CPC .......... H02K 1/145; H02K 1/146; H02K 1/17; H02K 1/22
See application file for complete search history.

(56) References Cited

U.S. PATENT DOCUMENTS 3,760,205 A * 9/1973 Imris ....................... H01F 29/10
                                                        310/168
4,554,471 A * 11/1985 Bertram ............... H02K 21/185
                                                        310/49.33
(Continued)

FOREIGN PATENT DOCUMENTS

CN      106385153 A     2/2017
FR      3033957 A1      9/2016
(Continued)

OTHER PUBLICATIONS

Office Action from the European Patent Office for European Patent Application No. EP18180138.2, dated Feb. 25, 2020.
(Continued)

*Primary Examiner* — Robert W Horn
(74) *Attorney, Agent, or Firm* — Locke Lord LLP; Scott D. Wofsy; Judy R. Naamat

(57) ABSTRACT

A stator for a generator includes a ferromagnetic core with two or more poles arranged about a rotation axis, a direct current (DC) field coil, and four or more alternating current (AC) coils. The DC field coil is wrapped about the pole. A first of the AC coils is wrapped about the pole at a location circumferentially spaced from a second of the AC coils. Generator systems and methods self-exciting synchronous reluctance generators are also described.

20 Claims, 4 Drawing Sheets

(51) Int. Cl.
  *H02K 11/00* (2016.01)
  *H02K 11/04* (2016.01)
  *H02K 21/48* (2006.01)

(56) References Cited

U.S. PATENT DOCUMENTS

| | | | |
|---|---|---|---|
| 4,769,568 A | 9/1988 | Kawamura | |
| 4,864,174 A | 9/1989 | Kawamura et al. | |
| 4,959,605 A * | 9/1990 | Vaidya | H02K 16/00 310/156.08 |
| 5,051,640 A | 9/1991 | Freise | |
| 5,418,415 A * | 5/1995 | Ishizaki | H02K 1/246 310/162 |
| 5,672,925 A * | 9/1997 | Lipo | H02K 19/103 310/154.11 |
| 5,729,071 A * | 3/1998 | Steiner | H02K 1/14 310/172 |
| 5,850,133 A * | 12/1998 | Heglund | H02P 9/02 318/700 |
| 5,923,142 A * | 7/1999 | Li | H02P 25/095 310/165 |
| 6,020,711 A * | 2/2000 | Rubertus | H02K 7/1823 318/254.2 |
| 6,859,993 B2 * | 3/2005 | Nutter | H02K 17/08 29/596 |
| 2001/0002777 A1 * | 6/2001 | Ravinovici | H02K 17/42 310/166 |
| 2018/0375392 A1 * | 12/2018 | Gieras | H02K 1/17 |

FOREIGN PATENT DOCUMENTS

| | | |
|---|---|---|
| GB | 2468695 A | 9/2010 |
| WO | WO-2017051505 A1 | 3/2017 |

OTHER PUBLICATIONS

Extended European Search Report for European Patent Application No. EP18180138.2, dated Oct. 30, 2018.

* cited by examiner

SELF-EXCITING SYNCHRONOUS RELUCTANCE GENERATORS

CROSS REFERENCE TO RELATED APPLICATIONS

This application is a Continuation of U.S. patent application Ser. No. 15/634,795 filed Jun. 27, 2017, which is incorporated herein by reference in its entirety.

BACKGROUND OF THE INVENTION

1. Field of the Invention

The present disclosure relates to generators, and more particularly to synchronous reluctance generators with self-excitation systems.

2. Description of Related Art

Electrical systems, such as on aircraft, commonly employ generators. Generators typically receive mechanical rotation from a rotation source like an engine and convert the mechanical rotation into electrical power. The rotation is applied to the generator rotor, which moves a magnetic field created by the generator relative to windings that are fixed relative to the rotor. Movement of the magnetic field induces electrical current in the windings, which the generator provides to the electrical system as electrical power. The magnetic field is typically generated by windings carried by the rotor, permanent magnets affixed to the rotor, or reluctance-type rotors. Reluctance-type rotors become magnetized by flowing a current in proximity to the rotor, typically through an excitation winding located on the stator core.

Because generators with reluctance-type rotors do not have permanent magnets or windings on the rotor, such generators can operate in harsh environments. They are also able to operate at relatively high temperatures. On the other hand, generators with reluctance-type rotors are generally not self-excited. This means that generators employing reluctance-type rotors must typically operate in the power grid, where wound-field type synchronous generators are connected.

Such conventional methods and systems have generally been considered satisfactory for their intended purpose. However, there is still a need in the art for improved systems and methods for generating electrical power. The present disclosure provides a solution for this need.

SUMMARY OF THE INVENTION

A stator for a generator includes a ferromagnetic core with two or more poles arranged about a rotation axis, a direct current (DC) coil and four or more alternating current (AC) coils. The DC coil and two of the AC coils are wrapped about the pole. A first of the AC coils is wrapped about the pole at a location that is circumferentially spaced from a second of the AC coil relative the rotation axis.

In certain embodiments, the core can include a yoke. The yoke can extend about the rotation axis and can couple a first of the poles to a second of the poles. The poles can be salient-types poles with pole cores extending radially inward from the yoke. Each pole can include first and second pole shoes. The pole core can couple the second pole shoe to the first pole shoe. The first and second pole shoes can extend radially inward of the pole core, the second pole shoe extending radially inward from the pole core at a location circumferentially offset from the first pole shoe.

In accordance with certain embodiments, the DC coil can be wrapped about the pole core. The first AC coil can be wrapped about the first pole shoe. The second AC coil can be wrapped about the second pole shoe. The first and second AC coils can be arranged radially inward of the DC coil. The second AC coil can be connected in parallel with the first AC coil. The second AC coil can be connected in series with the first AC coil.

It is also contemplated that a permanent magnet can be seated in the stator circumferentially adjacent first pole shoe. The permanent magnet (PM) can be seated on side of the first pole shoe circumferentially opposite to the second pole shoe. The PM can be arranged radially inward of the first and second AC coils. A second PM magnet can be seated in the stator circumferentially adjacent the second pole shoe. The second PM can be seated on a side of the second pole circumferentially opposite the second pole shoe.

A generator includes a stator as described above, a rotor, and a common lead. The rotor has no permanent magnets, no windings, and is supported for rotation relative to the stator about the rotation axis. A common lead connects the first AC and the second AC coil to the DC coil.

In certain embodiments, a yoke extends about the rotation axis and couples the first and second poles. A pole core extends radially inward from the yoke. The DC coil is wrapped about the pole core. A first pole shoe extends shoe extends radially inward from the pole core. The first AC coil is wrapped about the first pole shoe. A second pole shoe extends radially inward from the pole core at a location circumferentially offset from the first pole shoe. The second AC coil is wrapped about the second pole.

In accordance with certain embodiments, the generator can include first and second PMs. The first PM is seated against the first pole shoe radially inward of and circumferentially offset from the first AC coil on a side of the first pole shoe circumferentially opposite the second pole shoe. The second PM is seated against the second pole shoe radially inward of second AC coil on a side of the second pole shoe circumferentially opposite the first pole shoe.

It is also contemplated that, in accordance with certain embodiments, the generator can include a DC coil current regulator and a common lead. The DC coil current regulator connects the common lead to the DC coil. The generator can include a single-phase rectifier. The single-phase rectifier can connect the first and second AC coils to the DC coil through the common lead. A three-phase inverter can be connected to the single-phase inverter by the common lead.

A method of self-exciting a synchronous reluctance generator includes magnetizing a rotor with magnetic flux communicated by a permanent magnet. The method also includes rotating the rotor relative to a stator having a DC coil and AC coils. Rotation of the magnetized rotor induces an AC flow in the AC coils. The AC flow in the AC coils is rectified into a DC flow, which is applied to the DC coil as an excitation DC flow. The rotor is further magnetizing the rotor with magnetic flux communicated from the DC coil. In certain embodiments, the rotor can be magnetized while stationary relative to the stator. In accordance with certain embodiments magnetized by the permanent magnet prior to excitation current being applied to the DC coil.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
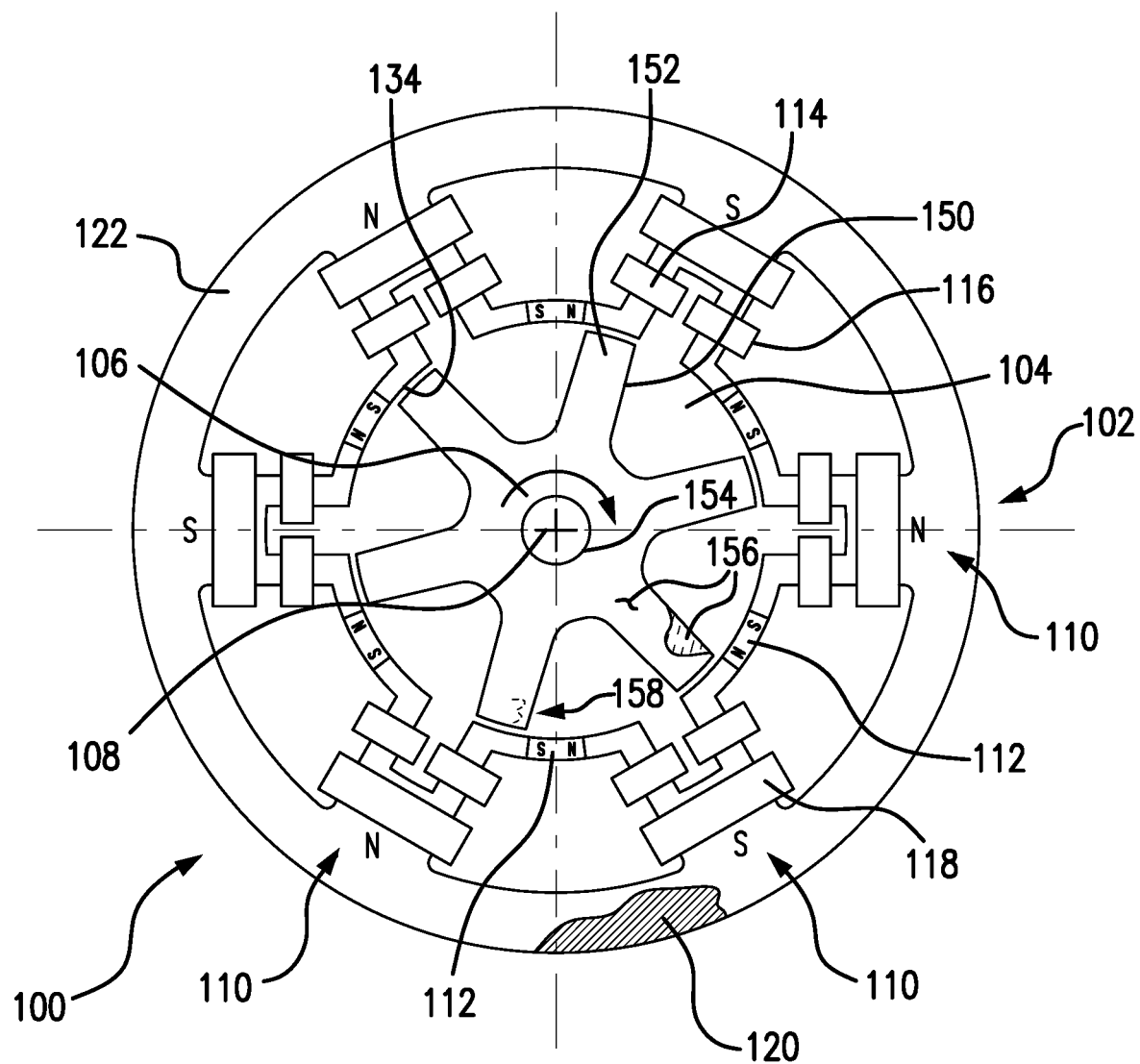
FIG. 1 is a cross-sectional view of an exemplary embodiment of a generator constructed in accordance with the present disclosure, showing the a rotor supported for rotation about a rotation axis relative to a stator.

Reference will now be made to the drawings wherein like reference numerals identify similar structural features or aspects of the subject disclosure. For purposes of explanation and illustration, and not limitation, a partial view of an exemplary embodiment of a 6-pole stator in accordance with the disclosure is shown in FIG. 1 and is designated generally by reference character 100. Other embodiments of stators, generators, and methods of self-exciting generators in accordance with the disclosure, or aspects thereof, are provided in FIGS. 2-4, as will be described. The systems and methods described herein can be used for self-exciting synchronous reluctance generators, such as in aircraft electrical systems, though the present disclosure is not limited to aircraft or to generator in general.

Referring to FIG. 1, generator 100 is shown. Generator 100 has a stator 102 and a rotor 104. Rotor 104 is supported for rotation 106 relative to stator 102 about a rotation axis 108. Stator 102 has a plurality of poles 110 distributed circumferentially about rotation axis 108, a DC coil 118, and a plurality of permanent magnets (PMs) 112. Each pole 110 has a first AC coil 114 and a second AC coil 116 arranged to cooperate with the plurality of PMs 112, rotor 104, and DC coil 118 to provide self-excitation excitation to generator 100, as will be described. Although generator 100 is described herein with an inner rotor, those of skill in the art will appreciate that the present disclosure will also benefit generators with outer rotors.

Stator 102 includes a ferromagnetic core 120 with a yoke 122. Yoke 122 extends circumferentially about rotation axis 108 and couples the plurality of poles 110 to one another. In the illustrated exemplary embodiment, stator 102 includes six (6) salient poles spaced apart from one another about rotation axis 108. This is for illustration purposes only and is non-limiting. Those of skill in the art will readily appreciate in view of the present disclosure that stator 102 can have fewer than six or more than six poles, as suitable for a given application.

Figure 2:
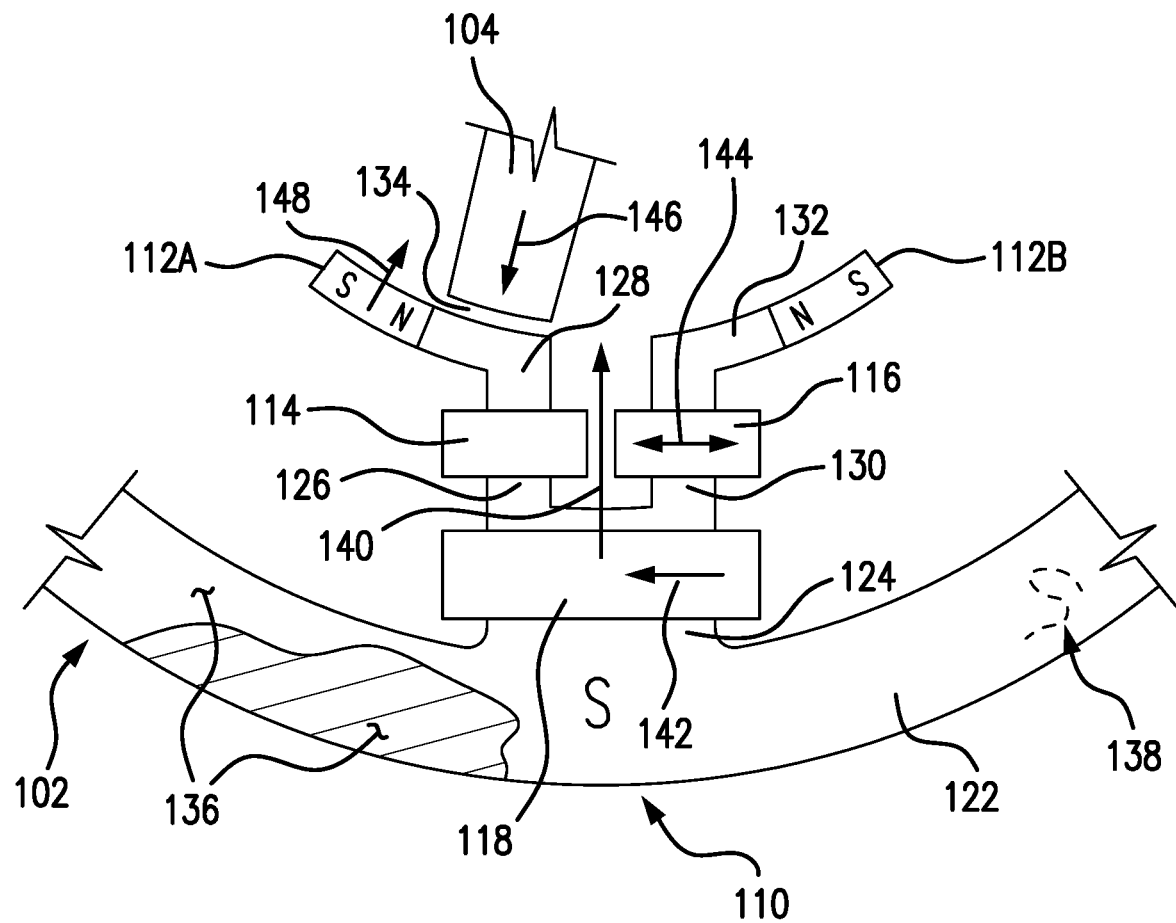
FIG. 2 is partial cross-section view of the generator of FIG. 1, showing a pole of the generator with direct current (DC) coil and alternating current (AC) coils arranged radially outward from permanent magnets for generator self-excitation.

With reference to FIG. 2, an exemplary pole 110 is shown. Pole 110 extends radially inward from yoke 122 and is split radially. In this respect pole 110 includes a pole core 124, a first split part 126, and a first pole shoe 128. Pole 110 also includes a second split part 130 and a second pole shoe 132. Pole core 124 is coupled to yoke 122 and extends radially inward from yoke 122 toward rotation axis 108 (shown in FIG. 1). First split part 126 is coupled to pole core 124 on a side of pole core 124 opposite yoke 122 and extends radially inward from pole core 124. First pole shoe 128 is coupled to first split part 126 and on a side of first split part 126 opposite pole core 124, and extends radially inward from first split part 126. A radially inner face of first pole shoe 128 bounds a gap 134 (shown in FIG. 1) defined between stator 102 and rotor 104.

Second split part 130 is coupled to pole core 124 on a side of pole core 124 opposite yoke 122. Second split part 130 extends radially inward from pole core 124 and is circumferentially spaced apart from first split part 126. Second pole shoe 132 is coupled to second split part 130 on a side of second split part 130 opposite pole core 124, extends radially inward from second split part 130, and is circumferentially spaced apart from first pole shoe 128. A radially inner face of second pole shoe 132 bounds gap 134 between stator 102 and rotor 104.

In certain embodiments, stator 102 is constructed from a plurality of sheet members 136. Sheet members 136 are formed from magnetic steel material radially axially stacked along rotation axis 108 (shown in FIG. 1) and laminated to another. Fabricating stator 102 from sheet members 136 simplifies fabrication of stator 102 as the cross-sectional profile of the poles 110 can be formed by stamping sheet members 136 from sheet stock. In accordance with certain embodiments, stator 102 can be constructed from a sintered metallic powder 138, like ferrite. Sintered metallic materials allow for adjustment of the magnetic permeability of stator 102 by adjusting the composition of metallic powder 138, providing a mechanism for changing the amount of flux communicated by stator 102 for a given number of coil or winding turns.

With continuing reference to FIG. 2, pole 110 includes a segment of DC coil 118, first AC coil 114, and second AC coil 116. DC coil 118 is arranged radially between yoke 122 and the AC coils, i.e., first AC coil 114 and second AC coil 116. DC coil 118 is also wrapped about pole core 124 and arranged to communicate magnetic flux 140 across gap 134 to rotor 104. As will be appreciated by those of skill in art in view of the present disclosure, magnetic flux 140 is generated upon application of excitation DC flow 142 (shown in FIG. 3) to DC coil 118.

First AC coil 114 is arranged radially between DC coil 118 and first pole shoe 128. First AC coil 114 is wrapped about first split part 126 at a location radially overlapping DC coil 118. First AC coil 114 is also arranged for generating a first AC flow 144 (shown in FIG. 3) in response to movement of a rotor magnetic field 146 past first AC coil 114. Second AC coil 116 is similar to first AC coil 114 and is additionally wrapped about second split part 130. In certain embodiments second AC coil 116 can be connected electrically in parallel with first AC coil 114. In accordance with certain embodiments, second AC coil 116 can connected electrically in series with first AC coil 114.

A first PM 112A and a second PM 112B are seated in stator 102 on circumferentially opposite sides of pole 110. First PM 112A is seated in stator 102 circumferentially adjacent to first pole shoe 128 and on a side of first pole shoe 128 circumferentially opposite second pole shoe 132. First PM 112A is also arranged radially inward of the AC coils, i.e., first AC coil 114 and second AC coil 116, and on a side thereof radially opposite DC coil 118. First PM 112A is tangentially magnetized such that north (N) and south poles (S) of first PM 112A are circumferentially spaced apart from one another. The tangential arrangement of first PM 112A allows first PM 112A to communicate persistent magnetic flux 148 to rotor 104 sufficient to maintain residual magnetization of rotor 104 such that rotor magnetic field 146 remains present without excitation DC flow 142 through DC coil 118. It is contemplated that the residual magnetization be such that rotation of rotor 104 during start-up induces first AC flow 144 of sufficient magnitude to begin generating excitation DC flow 142, enabling generator 100 to self-excitation without the need for the grid or another synchronous generator to provide excitation power to generator 100. In certain embodiments first PM 112A is small, which enable the use of relatively small, low cost, ferrite-type magnets.

Second PM 112B is similar to first PM 112A and is additionally seated in stator 102 circumferentially adjacent to second pole shoe 132. In this respect second PM 112B is seated in stator 102 on a side of second pole shoe 132 circumferentially opposite first pole shoe 128. First PM 112A and second PM 112B are arrange such that a common pole abuts pole 110, e.g., north pole (N), which is of opposite polarity with respect to the polarity of pole 110 when excitation DC flow 142 is applied to DC coil 118.

Returning to FIG. 1, rotor 104 has no PMs, no windings, and includes a rotor ferromagnetic body 150. Ferromagnetic body 150 has a plurality of salient poles 152. Salient poles 152 are circumferentially distributed about rotor 104 and bound gap 134, each salient pole 152 extending radially outward relative towards stator 102. In the illustrated ferromagnetic body 150 is seated on a shaft 154, which arranged along rotation axis 108. In certain embodiments rotor 104 is constructed from a plurality of sheet members 156 formed from magnetic steel material, radially stacked along rotation axis 108 laminated to another. In accordance with certain embodiments, rotor 104 can be formed from a sintered metallic powder 158, such as ferrite.

In the illustrated exemplary embodiment rotor 104 has six salient poles 152 and stator 102 has six major poles 110. Stator 102 additionally has twelve minor poles formed by the plurality of pole shoes, e.g., second pole shoe 128 (shown in FIG. 2) and second pole shoe 132 (shown in FIG. 2), arranged at circumferentially opposite ends of each PM, e.g., PM 112. During operation the proximity of PMs 112 to rotor 104 causes rotor 104 to retain a residual amount of magnetization when no excitation current is applied to DC coil 118.

Because of the residual magnetization remaining in rotor 104, application of rotational energy to rotor 104 causes rotor 104 to induce an AC current flow through the AC coils, e.g., first AC coil 114 and second AC coil 116, prior to an excitation current to DC coil 118. The induced AC current flow is rectified and applied to DC coil 118 as a DC excitation current at start-up, thereby allowing increase in excitation DC flow commensurate with increasing AC current flow until steady state is reached. Although illustrated as having six main stator poles, six rotor salient poles, and twelve stator minor poles, it is to be understood and appreciated that generator 100 can have fewer or more than six main stator poles and rotor salient poles, as suitable for an intended application.

Figure 3:
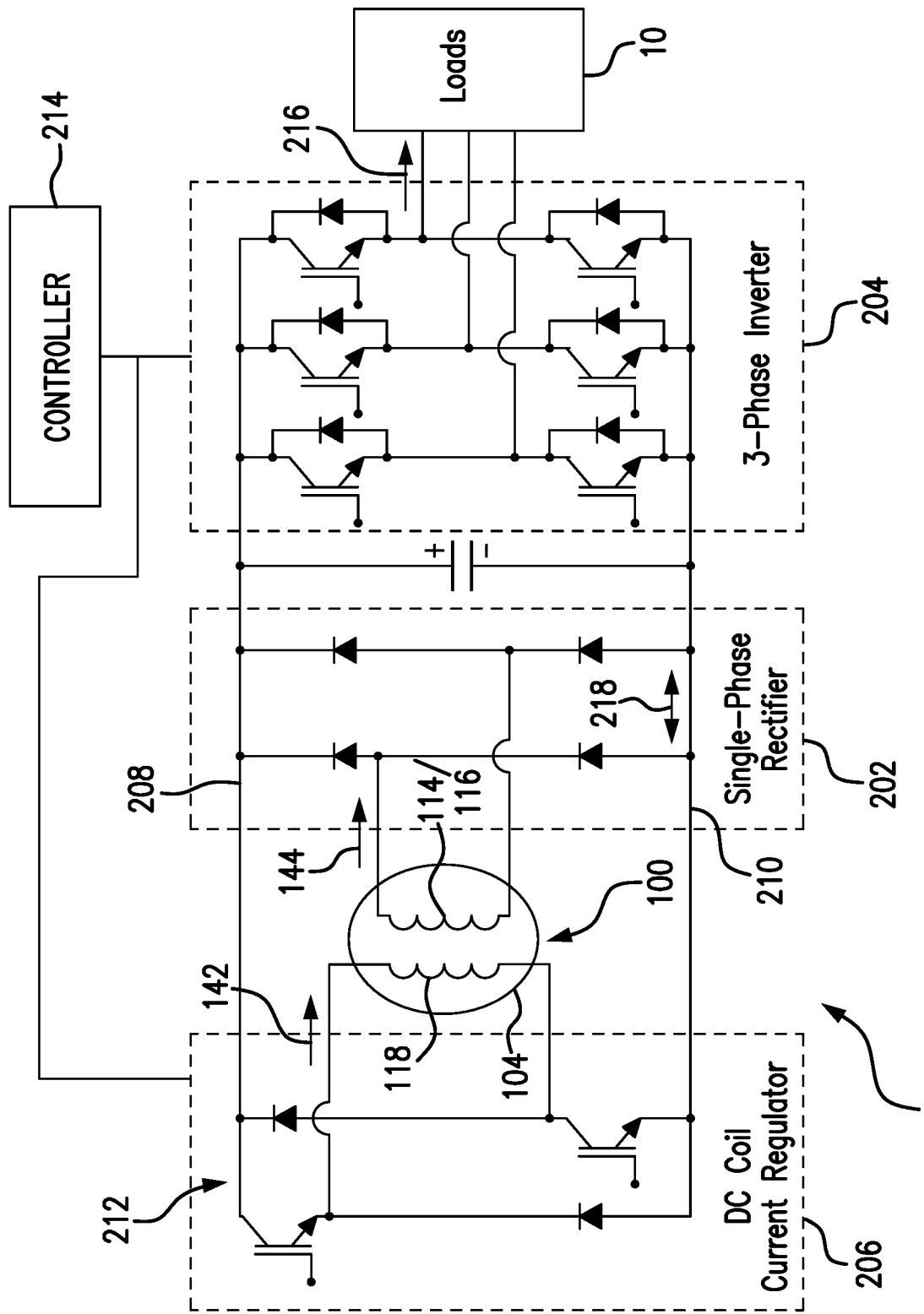
FIG. 3 is a schematic diagram of a generator arrangement including the generator of FIG. 1, showing the generator AC coils connected to a DC coil by a single-phase rectifier and a DC coil current regulator.

With reference to FIG. 3, a generator system 200 including generator 100 is shown. Generator system 200 includes generator 100, rectifier 202, a 3-phase inverter 204, and a DC coil current regulator 206. Rectifier 202 is connected to an AC winding that includes a plurality of AC coils, e.g., first AC coil 114 and second AC coil 116, and DC coil 118 such that at least a portion of AC power generated in the AC winding is converted into DC power for application to DC coil 118. It is contemplated that the number of AC coils be equal to twice the number of poles in generator 100, e.g., six poles and 12 AC coils. 3-phase inverter 204 is connected to rectifier 202 and is arranged to provide AC power to one or more electrical load 10 connected to 3-phase inverter 204. Although shown a 3-phase inverter in the illustrated exemplary embodiment, it is to be understood that inverters having fewer than three phases and more than three phases can benefit from the present disclosure.

Rectifier 202 is also connected to DC coil current regulator 206 and is arranged to provide a DC flow 218, which is routed DC coil current regulator 206 and/or provided to 3-phase inverter 204. DC coil current regulator 206 is connected to rectifier 202 and 3-phase inverter 204 through a source common lead 208 and a return common lead 210. It is contemplated that DC coil current regulator 206 and 3-phase inverter 204 each include a switch-diode arrangement that is operably controlled by a controller 214 to route current from rectifier 202 to the DC winding of generator 100, the DC winding include a plurality of DC coils, e.g., DC coil 118, during start-up to provide self-excitation, and thereafter route power to 3-phase inverter 204 for inversion into load power 216 once generator 100 attains a selected level of excitation.

Figure 4:
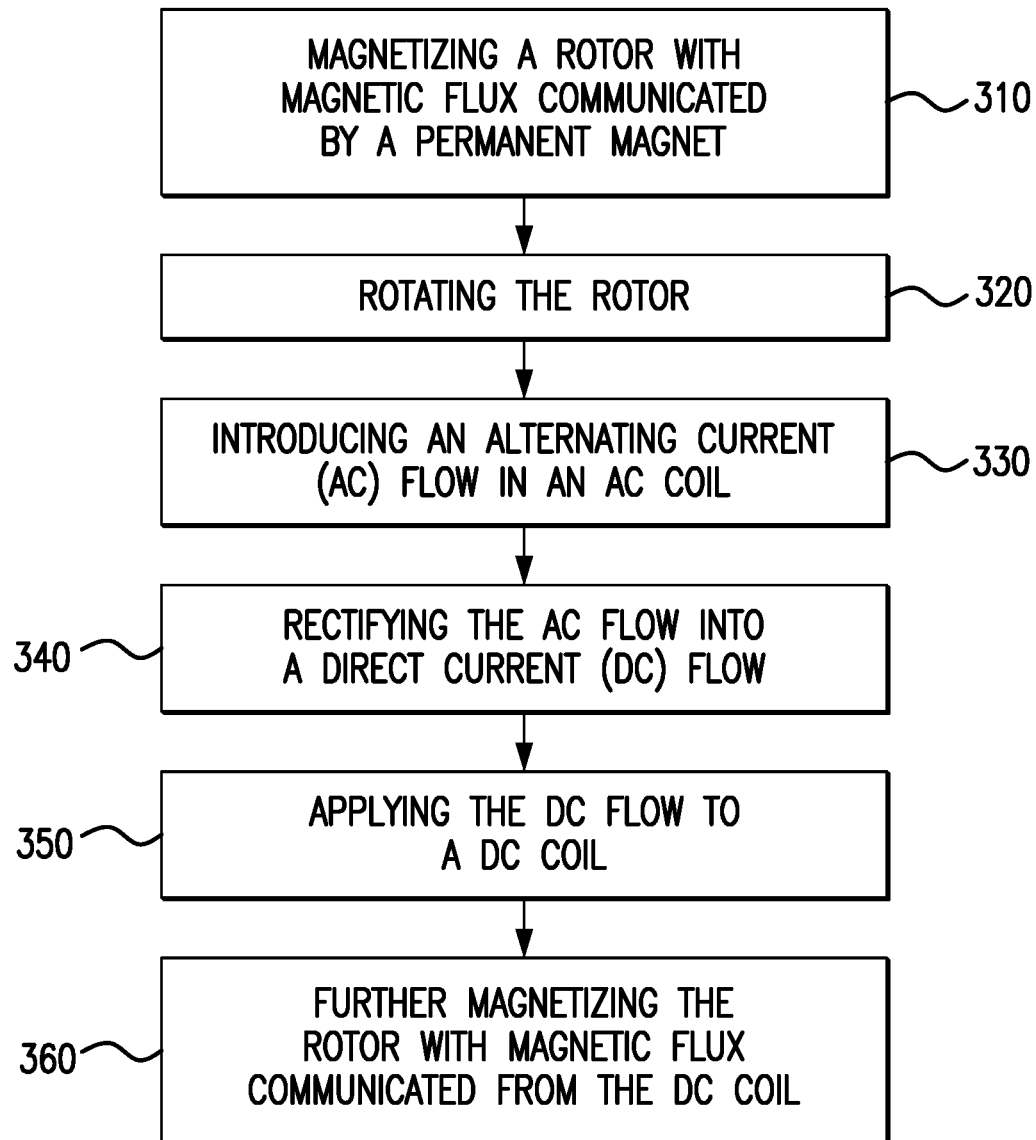
FIG. 4 is a block diagram of a method of self-exciting a synchronous reluctance generator, showing steps of the method.

With reference to FIG. 4, a method 300 of self-exciting a synchronous reluctance generator, e.g., generator 100 (shown in FIG. 1), is shown. Method 300 includes magnetizing a rotor, e.g., rotor 104 (shown in FIG. 1), as shown with box 310. Magnetizing the rotor can be done while the rotor is stationary and/or when there is no excitation current flowing through the rotor DC coil, e.g., DC coil 118. It is contemplated magnetization can be done by communicating magnetic flux across a gap defined between the rotor and a stator, e.g., stator 102 (shown in FIG. 2), from PMs seated in the rotor stator, e.g., PM 112 (shown in FIG. 1).

The rotor is rotated relative to the stator by applying rotational energy the rotor, as shown with box 320. As the rotor rotates the magnetized rotor induces an AC flow in AC coils arranged in the stator, e.g., first AC coil 114 and second AC coil 116, as shown with box 330. The AC flow is rectified into a DC flow, as shown with box 340, and is shunted to the DC coil, as shown with box 350, where the DC flow further magnetizes the rotor. Further magnetizing the rotor increases AC current induced in the AC coils until such point that sufficient power is available for powering an electrical load, e.g., electrical load 10, connected to the generator, at which time a portion of the DC current is inverted to application to the electrical load.

Synchronous reluctance generators typically have rotors without PMs and windings, and once originating self-excitation power sufficient for sustained operation, are generally tolerant of harsh operating environments and/or high temperatures. In embodiments described herein, synchronous reluctance generators are described that are capable of self-excitation, i.e., are capable to start-up without requiring an external source of excitation power, allowing the generator to operate as a stand-alone power source in an electrical system. Self-excitation allows the generator to be employed in electrical systems that are not connected to another power source, like another synchronous machine or electrical grid, allowing the generator to be used in vehicles like aircraft and wind generators that are not connected to a grid. This generator is predicted to be used as auxiliary power unit (APU) of an aircraft. It can be also used as engine-driven main generator of an aircraft.

As an exemplary embodiment, a 6-pole generator is described herein. The 6-pole generator has a 6-pole stator with six main poles and six DC field coils with concentrated parameters for excitation. Each stator main pole is split into two symmetrical parts that create armature poles. The number of armature poles and coils is equal to the double the number of DC poles and coils. There are tiny PMs arranged between stator poles that are magnetized tangentially only to provide residual magnetism, the magnetic flux required for the residual magnetization of the stator being small, allowing use of ferrite PMs. The residual magnetism initiates the build-up process and generation of the EMF in the DC field coils.

The generator has split poles and both DC field coils and AC coils on the stator. Since there are two AC coils at each main pole, the AC coils can be connected electrically in parallel with one another. The magnetic flux in the split parts of the pole and currents in AC coils can have the same polarity. The DC field coils can be connected electrically in series or in parallel with one another. The AC coils can be connected to a single-phase rectifier. The single-phase rectifier can be through a current regulator to the DC field coil to provide the excitation flux to the generator. PMs in the stator are only necessary to provide residual magnetism when the generator starts. After the generator reaches a constant rotational speed, it is contemplated that the EMF of the AC coils increases to a level suitable for steady state operation because the DC field coil increases commensurate with the main pole magnetic flux.

In certain embodiment generators and generator arrangements have no slip rings, no brushless exciters, and do not have PMs in the rotor. In accordance with certain embodiments, relatively small PMs are arranged in the stator core provide residual magnetism. It is contemplated that easy connection can be made in parallel paths of both the AC coils and the DC field coils. It is also contemplated that the generator can operate reliably at both low speeds and high speeds in aerospace applications.

The methods and systems of the present disclosure, as described above and shown in the drawings, provide for generators and generator arrangements with superior properties including self-excitation without the need of an external source of rotation. While the apparatus and methods of the subject disclosure have been shown and described with reference to preferred embodiments, those skilled in the art will readily appreciate that change and/or modifications may be made thereto without departing from the scope of the subject disclosure. For example, although generators are described herein with self-excitation capability, it is to be understood and appreciated that motors can also be constructed having self-starting capability.

What is claimed is:

1. A stator for a generator, comprising:
   a ferromagnetic core with a plurality of poles arranged about a rotation axis; and
   a direct current (DC) coil wrapped about the poles,
   wherein the plurality of poles include first and second alternating current (AC) coils wrapped about each of the plurality of poles, the second AC coil being circumferentially spaced apart from the first AC coil relative to the rotation axis, and
   wherein each of the poles is split into two symmetrical parts that create armature poles.

2. The stator as recited in claim 1, wherein the second AC coil is connected in parallel with the first AC coil.

3. The stator as recited in claim 1, wherein the second AC coil is connected in series with the first AC coil.

4. The stator as recited in claim 1, wherein the first and second AC coils are arranged radially inward of the DC coil.

5. The stator as recited in claim 1, wherein the ferromagnetic core includes a yoke extending about the rotation axis and coupling a first of the poles to a second of the poles.

6. The stator as recited in claim 5, wherein the pole is a salient-type pole with a pole core, wherein the pole core extends radially inward from the yoke.

7. The stator as recited in claim 6, wherein the DC coil is wrapped about the pole core.

8. The stator as recited in claim 5, wherein the pole includes a first pole shoe and a second pole shoe, wherein the first pole shoe extends radially inward from the pole core, wherein the second pole shoe extends radially inward from the pole core at a location circumferentially offset from the first pole shoe.

9. The stator as recited in claim 8, wherein the first AC coil is wrapped about the first pole shoe.

10. The stator as recited in claim 8, wherein the second AC coil is wrapped about the second pole shoe.

11. The stator as recited in claim 8, further comprising a permanent magnet (PM) seated in the core at a location circumferentially adjacent to the first pole shoe and on a side of the first pole shoe opposite the second pole shoe.

12. The stator as recited in claim 11, wherein permanent magnet is arranged radially inward of the first and second AC coil.

13. The stator as recited in claim 11, wherein the PM is a first PM and further comprising a second PM, wherein the second PM is seated in the core circumferentially adjacent to the second pole and on a side of the second pole shoe opposite the first pole shoe.

14. A generator system, comprising:
    a stator as recited in claim 1;
    a rotor with no permanent magnets and no windings supported for rotation relative to the stator about the rotation axis; and
    a common lead connecting the first AC coil to the DC coil.

15. The generator system as recited in claim 14, wherein the stator includes:
    a yoke extending about the rotation axis and coupling the plurality of poles to one another;
    a pole core extending radially inward from the yoke, wherein the DC coil is wrapped about the pole core;
    a first pole shoe extending radially inward from the pole core, wherein the first AC coil is wrapped about the first pole; and
    a second pole shoe extending radially inward from the pole core at a location circumferentially offset from the first pole shoe, wherein the second AC coil is wrapped about the second pole.

16. The generator system as recited in claim 15, further comprising:
    a first permanent magnet (PM) connected to the first pole shoe radially inward of and circumferentially offset from the first AC coil, wherein the first PM is connected to the first pole shoe on a side of the first pole shoe opposite the second pole shoe; and
    a second PM connected to the second pole radially inward of and circumferentially offset from the second AC coil, wherein the second PM is arranged on a side of the second pole shoe opposite the first pole shoe.

17. The generator system as recited in claim 14, further comprising DC coil current regulator connecting the common lead to the DC coil.

18. The generator system as recited in claim 14, further comprising a single-phase rectifier connecting the first AC coil and the second AC coil to the DC coil through the common lead.

19. The generator system as recited in claim 18, further comprising a 3-phase inverter connected to the single-phase rectifier by the common lead.

20. A method of self-exciting a synchronous reluctance generator, comprising:
- magnetizing a rotor with magnetic flux communicated by a permanent magnet;
- rotating the rotor relative to a stator having a direct current (DC) coil and alternating current (AC) coils;
- regulating DC current to the DC coil;
- inducing an AC flow in the AC coil;
- rectifying the AC flow into a DC flow;
- applying the DC flow to the DC coil; and
- further magnetizing the rotor with magnetic flux communicated from the DC coil.

\* \* \* \* \*